United States Patent [19]
James et al.

[11] Patent Number: 4,720,063
[45] Date of Patent: Jan. 19, 1988

[54] MAIN LANDING GEAR WITH VARIABLE LENGTH DRAG BRACE

[75] Inventors: Milton E. James, Vashon; John A. Stepien, Renton, both of Wash.

[73] Assignee: The Boeing Company, Seattle, Wash.

[21] Appl. No.: 782,220

[22] Filed: Sep. 30, 1985

[51] Int. Cl.⁴ .......................................... B64C 25/10
[52] U.S. Cl. .............................................. 244/102 R
[58] Field of Search ........ 244/102 R, 102 A, 102 SL, 244/102 SS, 104 R

[56] References Cited

U.S. PATENT DOCUMENTS

| | | | |
|---|---|---|---|
| 2,308,846 | 1/1943 | White | 244/50 |
| 2,333,981 | 11/1943 | Bridges | 244/102 R |
| 2,392,892 | 1/1946 | Ward | 244/102 |
| 2,427,885 | 9/1947 | Turansky et al. | 244/102 |
| 2,432,408 | 12/1947 | Glasgow et al. | 244/102 |
| 2,437,135 | 3/1948 | Steinhoff et al. | 244/102 |
| 2,487,598 | 11/1949 | Saulnier | 244/102 |
| 2,497,415 | 2/1950 | Parker | 244/102 SL |
| 2,630,990 | 3/1953 | Kanode et al. | 244/102 |
| 2,690,888 | 10/1954 | Hawkins, Jr. | 244/102 R |
| 2,801,817 | 8/1957 | Brader | 244/102 R |
| 2,811,326 | 10/1957 | Westcott, Jr. | 244/102 R |
| 2,859,006 | 11/1958 | Lucien | 244/102 |
| 2,939,655 | 6/1960 | Hartel | 244/102 |
| 2,967,033 | 1/1961 | Langdon | 244/102 |
| 2,982,500 | 5/1961 | Lucien | 244/102 |
| 3,083,937 | 4/1963 | Bainbridge et al. | 244/102 R |
| 3,589,649 | 6/1971 | Leclercq | 244/102 R |
| 3,687,400 | 8/1972 | Fitzgerald et al. | 244/102 |
| 3,759,468 | 9/1973 | Boehringer et al. | 244/102 |
| 4,228,975 | 10/1980 | Sealey | 244/102 R |

FOREIGN PATENT DOCUMENTS

| | | |
|---|---|---|
| 733061 | 3/1943 | Fed. Rep. of Germany . |
| 1058374 | 5/1959 | Fed. Rep. of Germany . |
| 1081769 | 5/1960 | Fed. Rep. of Germany . |
| 1540976 | 10/1968 | France . |
| 215809 | 7/1941 | Luxembourg . |
| 486461 | 6/1938 | United Kingdom . |
| 1028669 | 5/1966 | United Kingdom ............ 244/102 R |

*Primary Examiner*—Joseph F. Peters, Jr.
*Assistant Examiner*—Lynn M. Fiorito
*Attorney, Agent, or Firm*—Delbert J. Barnard

[57] ABSTRACT

A hydraulic control cylinder (64) is used to swing the upper part (14) of a two part wheel strut (14, 16) about an axis of rotation (18) established at the upper end of the upper strut part (14) and at an upper central location within a stowage compartment (10). A folding drag brace assembly (102) is connected between the strut (16) and a lower rear portion of the stowage compartment (10). During use of the control cylinder (64) for swinging the upper strut part (14) rearwardly and upwardly, the drag brace (102) folds automatically in the manner of a pantographic device, and functions to fold the lower strut part (16) up against the upper strut part (14) within the stowage compartment (10). A mechanism is provided for rotating the wheel assembly (30) W, relative to the lower strut part (16), for the purpose of properly positioning the wheel assembly (30) W for movement into the stowage compartment (10). The invention makes it possible to retract the landing gear assembly (12) into a stowage compartment (10) which is considerably shorter than the in use length of the landing gear strut (14, 16) without the need for a second "down lock" member.

11 Claims, 6 Drawing Figures

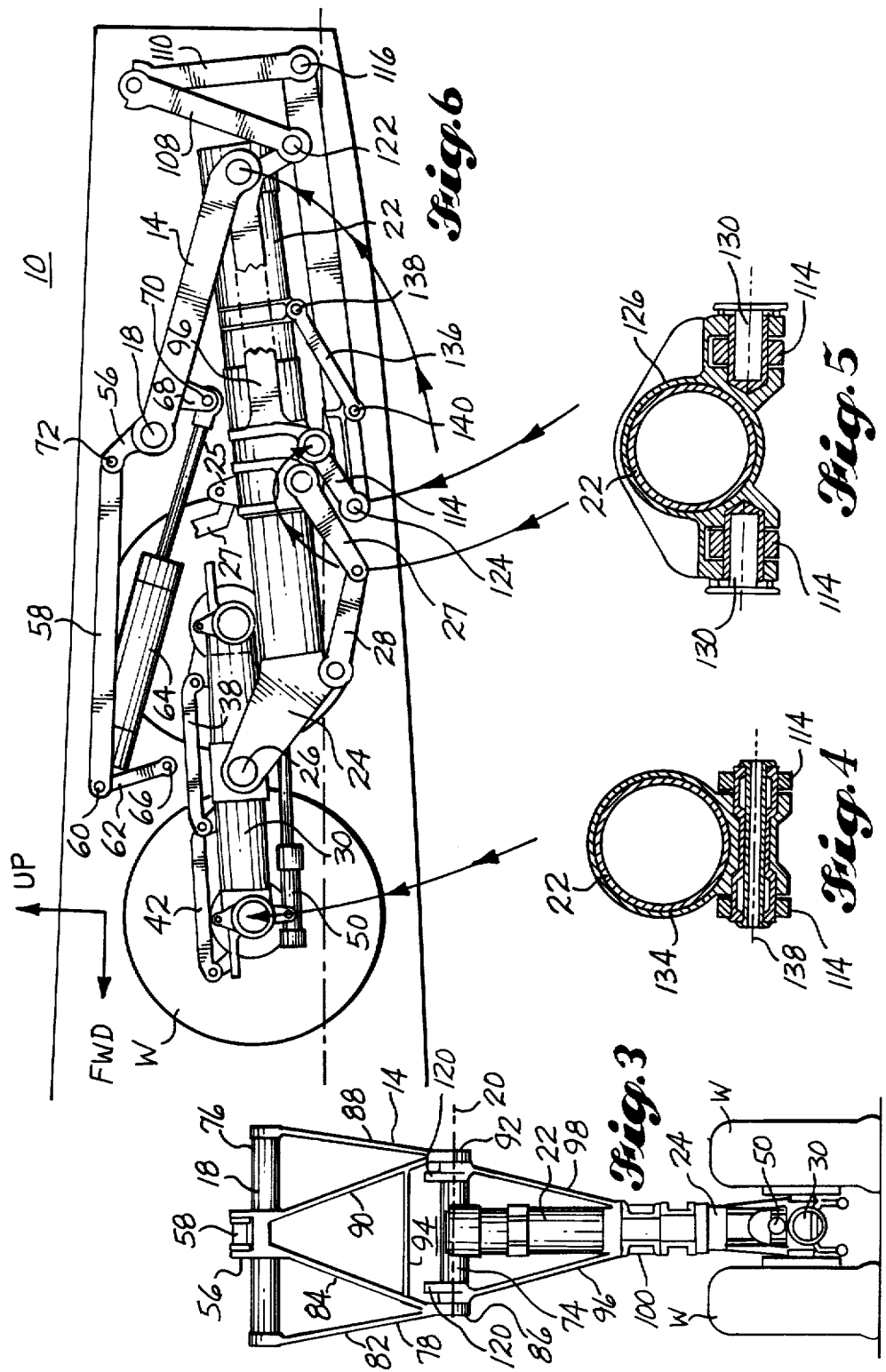

MAIN LANDING GEAR WITH VARIABLE LENGTH DRAG BRACE

The government has rights in this invention.

TECHNICAL FIELD

This invention relates to main landing gear for aircraft. More particularly, it relates to the provision of a main landing gear which includes a relatively long strut, and a drag brace, both of which are constructed to allow the landing gear to fold up into a stowage space which is considerably shorter than the in use length of the landing gear.

BACKGROUND INFORMATION

The patent literature includes many types of retractable landing gear arrangements for aircraft, as shown by the following patents: U.S. Pat. No. 2,308,846, granted Jan. 19, 1943, to John W. White; U.S. Pat. No. 2,392,892, granted Jan. 15, 1946, to Edward G. Ward; U.S. Pat. No. 2,427,885, granted Sept. 23, 1947, to Clement J. Turansky and Joseph A. Grom; U.S. Pat. No. 2,432,4008, granted Dec. 9, 1947, to Edward F. Furton and Charles S. Glasgow; U.S. Pat. No. 2,437,135, granted Mar. 2, 1948, to Gordon R. Steinhoff and James W. Blair; U.S. Pat. No. 2,487,598, granted Nov. 8, 1949, to Raymond Saulnier; U.S. Pat. No. 2,630,990, granted Mar. 10, 1953, to Albert E. Kanode, Conrad H. Cooke and Frederick V. Lindquist; U.S. Pat. No. 2,811,326, granted Oct. 29, 1957, to William B. Westcott, Jr.; U.S. Pat. No. 2,859,006, granted Nov. 4, 1958, to Rene Lucien; U.S. Pat. No. 2,939,655, granted June 7, 1960, to Erwin H. Hartel; U.S. Pat. No. 2,967,033, granted Jan. 3, 1961, to Kenneth T. P. Langdon; U.S. Pat. No. 2,982,500, granted May 6, 1961, to Rene Lucien; U.S. Pat. No. 3,589,649, granted June 29, 1971, to Jacques Leclercq and Claude Victor; U.S. Pat. No. 3,687,400, granted Aug. 29, 1972, to John M. Fitzgerald and Varnell L. James; U.S. Pat. No. 3,759,468, granted Sept. 18, 1973, to Wilfred E. Boehringer and Donald C. Callas; U.S. Pat. No. 4,228,975, granted Oct. 21, 1980, to Francis Sealey; British Pat. No. 486,641, accepted June 3, 1938; French Pat. No. 1,640,976, Bulletin date of Oct. 4, 1968; German Patentschrift No. 733,061, Auscegeben date of Mar. 18, 1943; GermanAuslegeschrift No. 1,058,374, Auslegeschrift date of May 27, 1959; German Auslegeschrift No. 1,081,769, Auslegeschrift date of May 12, 1960; and Luxembourg Patent Document No. 215,809, registered July 15, 1941.

The above patents show ways of constructing an Oleo strut. They also show articulated landing gear struts and various types of folding drag brace trusses. These patents should be considered for the purpose of putting the present invention into proper perspective with respect to the prior art.

A primary object of the present invention is to make it possible to easily move a relatively long main landing gear into and out from a relatively short stowage space, with a minimum of complexity in the design of the landing gear assembly.

DISCLOSURE OF THE INVENTION

The landing gear of the present invention is basically characterized by a folding wheel strut comprising an upper portion and a lower portion. The upper end of the upper portion is pivotally mounted onto a frame portion of the aircraft, in an upper central portion of a stowage compartment for the landing gear. The two parts of the folding wheel strut are pivotally connected together where they meet. A folding drag brace truss extends between a frame portion of the aircraft, at a lower rear end portion of the stowage compartment, and the lower portion of the folding wheel strut. An actuator is provided for swinging the upper portion of the folding wheel strut between a vertical down position and a retract position in which it is up in the stowage compartment. The folding drag truss functions to lift the lower portion of the folding wheel strut and fold it up generally against the upper portion of the folding wheel strut when the actuator is operated to retract the landing gear. When the actuator is operated to deploy the landing gear, the folding drag brace truss operates automatically to swing the lower portion of the folding wheel strut downwardly. When the landing gear is in its in use position, the upper and lower portions of the folding wheel strut are substantially aligned and vertically oriented and the drag brace truss extends in a bracing manner between the landing gear and the frame portion of the aircraft to which it is connected.

The detailed description of the best mode and the claims also form a part of the description of the invention.

BRIEF DESCRIPTION OF THE DRAWING

Like reference characters are used to designate like parts throughout the several views of the drawing, and:

FIG. 3 is a rear elevational view of the wheel strut assembly, with the brace truss means omitted;

FIG. 4 is a cross-sectional view taken substantially along line 4—4 of FIG. 1;

FIG. 5 is a cross-sectional view taken substantially along line 5—5 of FIG. 1; and FIG. 6 is a side elevational view showing the wheel strut assembly retracted into the stowage compartment.

BEST MODE FOR CARRYING OUT THE INVENTION

Figure 1:
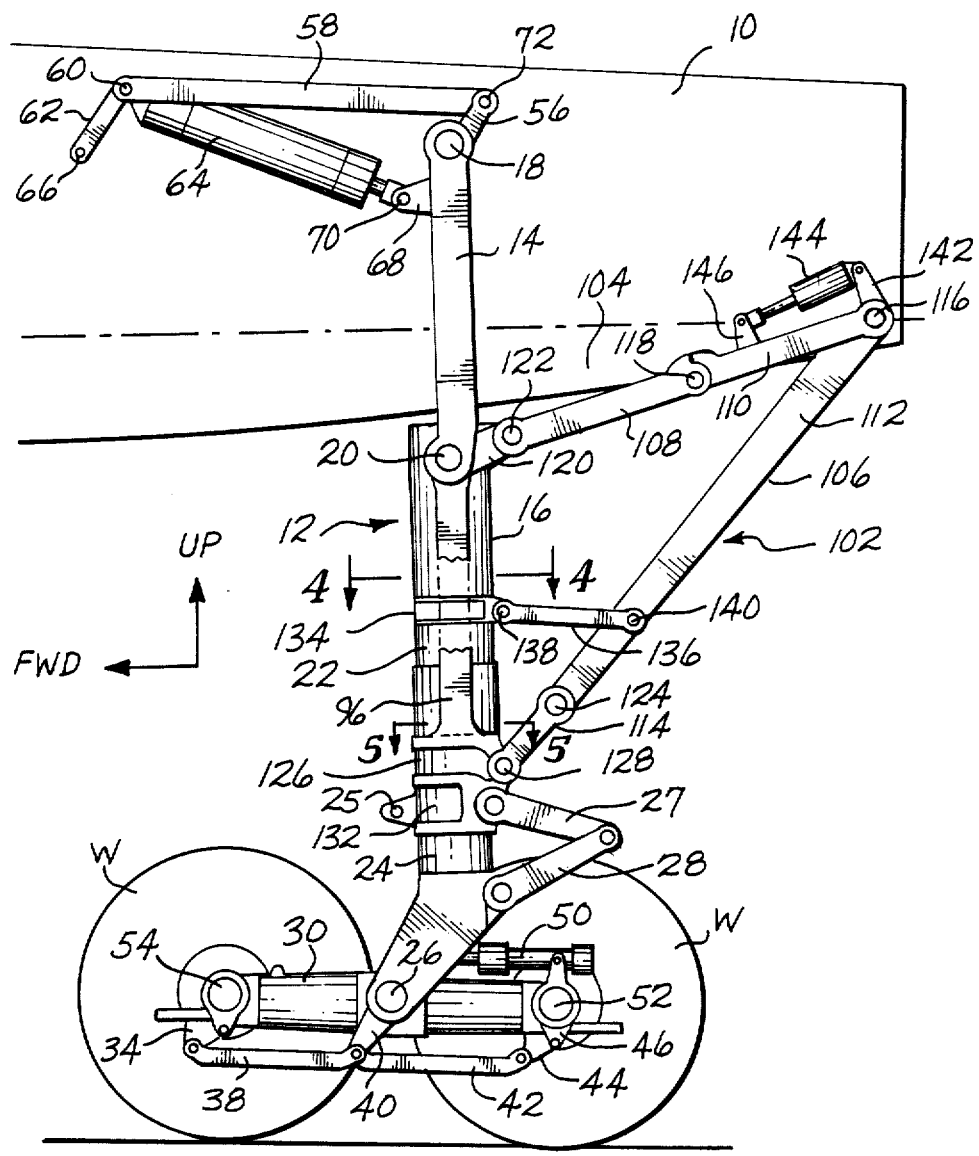
FIG. 1 is a side elevational view of an embodiment of the invention, showing the wheel strut assembly in its in use position, with a foreground central portion of a side part of the lower portion of the wheel strut cut away for clarity of illustration of an anchor collar, and with the foreground wheels removed to reveal the truck.
Figure 2:
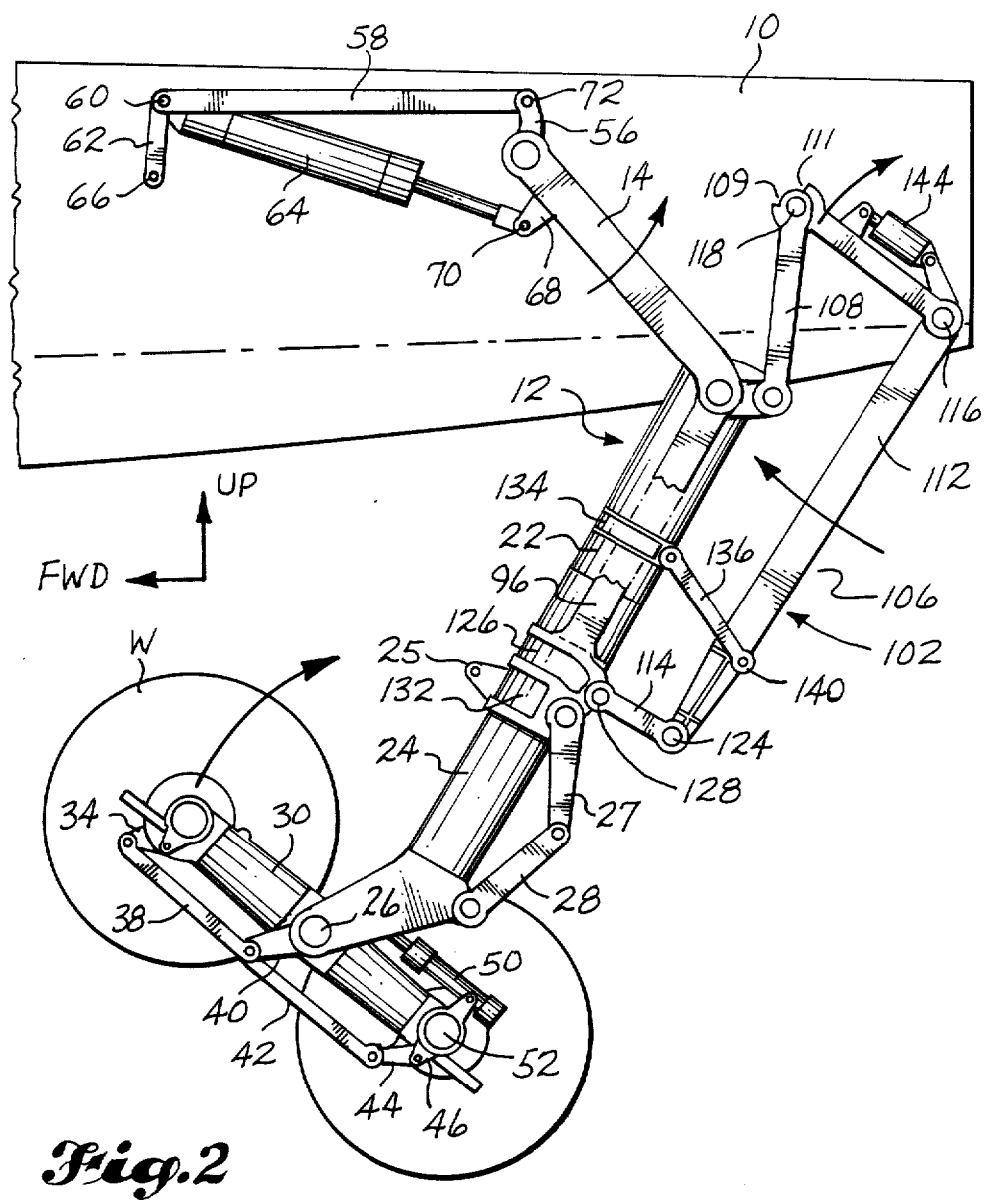
FIG. 2 is a view like FIG. 1, but showing the wheel strut assembly in the process of being retracted into a stowage compartment.

Referring to FIGS. 1, 2, and 6, appropriate frame structure is used to define a stowage compartment 10 in a wing or body portion of an aircraft.

The wheel strut assembly 12 comprises a folding wheel strut having an upper portion 14 and a lower portion 16. The upper portion 14 may be in the form of a multiple member truss (FIG. 3) and may be aptly termed a trapeze. Strut upper portion 14 includes means mounting it for rotation about a first horizontal axis 18 which is located at a first mounting station in an upper central portion of the stowage compartment 10. The lower end of upper strut portion 14 is pivotally connected to the upper end of lower strut portion 16, for pivotal movement about a second horizontal axis 20. Axis 18 is a fixed axis whereas axis 20 moves in position, as will hereinafter be described.

The lower strut portion 16 is what is commonly referred to as an "Oleo" strut. It comprises upper and lower telescopic members 22, 24 connected together by torque arms 27, 28, in a known manner.

The midportion of an axle beam 30 is pivotally connected to a lower portion of strut member 24, for pivotal movement about a horizontal axis 26. A set of four wheels W are mounted for rotation onto the opposite end portions of the axle beam 30, in a dual tandem arrangement. In accordance with an aspect of the present invention, an actuator 50 is interconnected between the axle beam 30 and the lower end of strut member 24, to control the position of the axle beam 30, and the wheels W carried thereby, relative to the wheel strut, during use, during extension and/or retraction and during stowage. The actuator 50, is attached at one end to arm 48, which is integral with axle beam 30, and at the other end to the lower end of strut member 24. During retraction, actuator 50 is extended, causing axle beam 30 to rotate about pivot point 26 such that in the stowed position (See FIG. 6) axle beam 30 is upside down from the position shown in FIG. 1.

A brake reaction rod 38 (whose function is known), is attached at its forward end to a forward brake and at its aft end to pivot point 41 which is located on an arm 40, which is an integral part of strut member 24. Each forward brake is connected to a brake rod 38. A brake reaction rod 32, is attached at its aft and to an aft brake and at its forward end to pivot point 41. As actuator 50 causes axle beam 30 to rotate relative to strut member 24 during retraction/extension, brake reaction rods 32 and 38 cause the brakes to pivot about axis 52 and/or 54. This can be seen by comparing FIGS. 1 and 6.

The upper end of the upper strut portion 14 includes a control arm or lever 56. Arm 56 is fixed in position with respect to strut portion 14. The free end of arm 56 is pivotally attached to one end of a reaction arm 58 at 72. The opposite end of reaction arm 58 is pivotally attached at 60 to both a free end of a swing arm 62 and the cylinder housing end of a hydraulic cylinder 64. The opposite end of arm 62 is pivotally attached to a portion of the aircraft frame, for pivotal movement about a fixed horizontal axis 66. The second or piston rod end of the hydraulic cylinder 64 is connected to a mounting ear 58 for pivotal movement about a horizontal axis 70. Mounting ear 68 is attached to strut upper portion 14 at a location spaced from the first pivotal axis 18. As will be evident from an inspection of FIGS. 1, 2 and 6, the relative length of the hydraulic cylinder 64 determines the positioning of the upper strut portion 14. When the cylinder 64 is in a retracted position, the strut portion 14 extends substantially vertically. When hydraulic cylinder 64 is inactive, it is in effect a fixed link extending between pivot point 60 and pivot point 70. It prevents rotation at any of the axes 60, 66, 70, 18, 72.

As a comparison of FIG. 1 to FIGS. 2 and 6 will show, an extension of hydraulic cylinder 64 will cause the upper strut portion 14 to swing in position about axis 18, in a direction away from cylinder 64. As the lower main body portion of strut portion 14 moves in position about axis 18, the upper arm 56 moves in the opposite direction, moving with it reaction arms 58 and 62 and the cylinder housing end of the cylinder 64.

In accordance with the present invention, hydraulic cylinder 64 is used for moving the wheel strut assembly 12 between its in use position, shown by FIG. 1, and its stowed position shown by FIG. 6. As cylinder 64 is being operated for the purpose of either extending or retracting the wheel strut assembly 12, cylinder 50 is being operated to position the axle beam 30, and the wheels W carried thereby, relative to the wheel strut member 24. As shown by FIG. 1, when the wheel strut assembly 12 is in its extended or in use position the cylinder 50 is relatively retracted and the axle beam 30 is substantially perpendicular to the wheel strut parts 14, 16, 24. As the cylinder 64 is being extended, for the purpose of retracting the wheel strut assembly 12, the cylinder 50 is being extended for the purpose of rotating the axle beam 30, and the wheels W carried thereby, in position, so that at about the time the wheel strut assemby 12 is entering the stowage compartment 10 the beam 30 and the wheels W have been substantially inverted in position.

As shown by FIG. 3, the upper end of strut part 22 may include a tubular cross member 74 that is attached at its center to the upper end portion of strut part 22. Cross member 74 gives the upper end of strut part 22 a generally T-shape.

The uppe end of strut part or "trapeze" 14 may comprise a tubular cross member 76 that is longer than cross member 74. The strut part 14 may comprise a pair of side parts 78, 80. Side part 78 may be composed of an outside member 82, and an inside member 84. As shown by FIG. 3, members 82, 84 may converge together and become joined at a hinge ear 86. Side part 80 may in similar fashion be composed of an outside part 88 and an inside part 90. Parts 88, 90 may converge together and merge into an opposite side hinge ear 92. Cross member 74 is positioned between hinge ears 86, 92, and is pivotally attached thereto by means of a suitable pivot pin means which extend through the hinge ears 86, 92, and at least through a portion of the cross member 74. A cross arm 94 may extend between and brace the lower portions of arms 84, 90.

As also shown by FIG. 3, the control arm 56 may be comprised of two side parts, constituting upward extensions of the arms 84, 90, to define a clevis in which an end portion of the arm is received.

As also shown by FIG. 3, the lower strut part 22 may comprise a pair of side arms 96, 98 which slope downwardly and inwardly from the outer ends of member 74, to points of connection with the strut part 24 generally at the upper end of a collar 100. As shown by FIG. 3, brace arm 96 may in effect be a downward continuation of brace arm 82 and brace arm 98 may in effect by a downward continuation of brace arm 88. Thus, the strut parts 14, 22 together define a wheel strut 14, 22 which when it is in its use position tapers from a relatively wide top portion 76, by which it is mounted for pivotal movement to a portion of the aircraft frame, down to a width closely equal to the diameter of the lower strut part 22 closely adjacent the lower end of the lower strut part 22.

The Oleo strut is in the nature of a shock absorber. As is well-known per se, it comprises a shock absorbing spring means which tends to bias the lower strut part 24 outwardly from strut part 22. When the weight of the aircraft is sitting on the landing gear, the strut part 24 is moved relatively upwardly into strut part 22. However, following a takeoff, when the weight of the aircraft is relieved from the landing gear, the shock absorbing mechanism within the members 22, 24 moves the strut part 24 outwardly relative to strut part 22. The torque arms 27, 28 couple the members 22, 24 together so that one will not rotate relative to the other during the in and out telescopic movement.

The folding brace truss will now be described. This truss is interconnected between intermediate and lower portions of the wheel strut 16, and a portion of the aircraft frame at the lower rearward part of the stowage compartment 10. Truss 102 comprises a three section upper diagonal arm 104 and a two section lower diagonal arm 106.

Upper truss arm 104 is composed of arm parts 108, 110. Lower truss arm 106 is composed of arm parts 112, 114. The rearward ends of arm parts 110, 112 meet and are connected to the aircraft frame structure, for pivotal movement about an axis 116. Axis 116 is located at a second mounting station within the stowage compartment 10. This second mounting station is spaced both horizontally rearwardly from, and vertically below the first mounting station whereat pivotal axis 18 is established.

Truss arm part 110 is pivotally attached at its end opposite pivotal axis 116 to an end of truss arm part 108, for pivotal movement about an axis 118. The opposite end of truss arm part 108 is pivotally connected to a control arm part 120, for pivotal movement about an axis 122.

As shown by FIG. 3, a pair of control arm parts 120 may be secured to the cross part 74 at the upper end of strut portion 16. The control arm parts 120 are fixed in position relative to the cross part 74, the housing part 22 and the side arms 96, 98.

The rearward end of truss arm part 112 is mounted for pivotal movement about the axis 116. The opposite end of member 112 is pivotally attached to an end of member 114, for pivotal movement about an axis 124. The opposite end of member 114 is pivotally attached to a collar 100, for pivotal movement about an axis 128.

As shown by FIG. 5, collar 100 is fixed in position with respect to strut part 22. It includes a clevis on each of its sides between which end portions of arms 114 are received. Pivot pins 130 extend through openings formed in the two side parts of the clevis, and in the end portions of the arms 114, to provide the pivotal connections.

Collar 100 may be like or similar to the collar 132 to which the torque arm 27 is attached.

In similar fashion, another collar 134 is fixed in position on strut part 22, at a location generally between pivotal axis 20 and pivotal axis 128. A brace arm 136 is connected between the collar 134 and a location on truss arm 112, spaced upwardly from the pivotal axis 128. Arm 136 is mounted at its forward end for pivotal movement about an axis 138 and is mounted at its rearward end for pivotal movement about an axis 140.

As best shown by FIG. 2, the inner ends of strut parts 108, 110 include stop shoulders 109, 111 which make abutting contact when the truss is unfolded (See FIG. 1). Stop shoulders 109, 111 prevent members 108, 110 from folding downwardly below an aligned position.

Brace truss 102 is what may be termed a passive truss. That is, it is folded and unfolded in response to pivotal movement of the upper strut portion 14, caused by extension and retraction of the cylinder 64.

When the wheel strut assembly 12 is in its in use position, as shown by FIG. 1, the brace truss parts 108, 110 are generally aligned with each other and with the control arm 120. The pivotal axes 20, 122, 118 and 116 are substantially within a common plane. Similarly, brace truss parts 112, 114 are substantially aligned and the pivotal axes 128, 124, 140, 116 are substantially within a common plane.

The upper arm 104 extends between a midportion of folding strut 16 and the second mounting station 116. Brace arm 104 extends at a slight diagonal, e.g. about twelve and a half degrees downwardly from horizontal. The lower brace arm 106 extends at a much sharper diagonal, e.g. about fifty degrees downwardly from horizontal.

A fixed arm 142, integral with part 112, may be provided at the second mounting station, to serve as a mount for one end of a lock actuator 144. The opposite end of the lock actuator 144 is connected to a mounting ear 146 which is secured only for the purpose of locking the brace arm member 110 in position relative to the fixed arm 142. When the control actuator 64 and the lock actuator 144 are fixed into the position shown by FIG. 1, the strut parts 14, 16 and the brace truss parts 108, 110, 112, 114, 136 are all fixed in position.

When lock actuator 144 is fully extended, the shoulder 111 on strut part 110 is moved into tight abutting contact with the shoulder 109 on strut part 108.

As mentioned above, the brace truss 102 is in effect a passive truss. When lock actuator 144 is allowed to move freely, and control actuator 64 is being operated to either extend or retract the wheel strut assembly 12, the various parts of the brace truss 102 move in response to movement of the strut part 14. For example, comparing FIGS. 1 and 2, when it is desired to retract the wheel strut assembly 12, the lock actuator 144 is contracted to cause pivot point 118 to move upward. Then, control cylinder 64 is extended. Thus causes strut upper part 14 to swing rearwardly about pivot axis 18. This in turn causes the position of pivotal axis 20 to move upwardly and rearwardly along arc 148. As this movement occurs, upper brace arm parts 108, 110 fold together. Part 110 rotates upwardly and rearwardly about pivot axis 116. Part 108 pivots about axis 118 and moves towards part 110, like the closing of a jackknife. Lower brace arm part 112 pivots upwardly about axis 116. Lower strut part 16 pivots about axis 20 and swings upwardly into the stowage compartment 10. As upper strut part 14 and lower strut part 16 move, they come together, in jackknife fashion, so that they are close together when the wheel strut assembly 12 is within the stowage compartment 10.

The drag brace 102 constitutes a novel utilization of a four-bar linkage in a way which allows the brace to fully stabilize the landing gear assembly 12 against fore and aft ground loads during landing, taxi and take-off without the addition of a secondary, hydraulically operated down locking system. During gear retraction after take-off, the drag brace assembly 102 automatically folds itself (in the manner of a pantographic device) to vary its own effective length such that the gear is constrained to be raised in a fully controlled and safe manner into its stowed position. In normal landing gear deployment, as well as in emergency free-fall operation, the drag brace assembly 102 does not rely on additional hydraulic, pneumatic, or mechanical spring or booster power to lower and set the gear in position for landing. Rather, the drag brace assembly 102 guides the landing gear 12 in an almost vertical drop path, enhancing the full effects of gravitational and aerodynamic forces to ensure the safe and positive deployment of the landing gear assembly 12.

The terminology used above was adapted for the purpose of this patent document. It is to be understood that different people and different companies in the industry use different terminology for describing parts and assemblies of the type which make up the present invention. The following is terminology which has been used in The Boeing Company.

Element 12 may be termed a "gear assembly". Element 14 is a "trunnion hanger" and it is part of a "retraction mechanism". Cylinder 64 may be termed the "retraction cylinder" or "extension/retraction cylinder". Link 62 may be termed an "idler link". Element 58 may be termed a "walking beam".

Element 16 may be termed a "shock strut" or "shock absorber". Elements 108, 110 together define a "down lock strut" or "reaction strut". Element 108 is the "front link of the down lock strut". Cylinder 144 may be termed a "down lock cylinder" or "down lock actuator". Elements 114 and 106 constitute a "drag brace". Element 106 is the "upper link of the drag brace". Element 114 is the "lower link of the drag brace". Element 136 may be termed a "stabilizer link".

Element 27 and 28 are commonly termed the "torque linkage". Element 24 is termed the "inner cylinder". Element 30 is commonly referred to as the "truck beam" or "axle beam". This beam and the various elements supported thereby are referred to as the "truck". Cylinder 50 may be termed the "truck positioner cylinder" or "truck actuator". Elements 38,42 are "brake rods". Element 40 is a "control for the brake rods".

More specifically, the truck or truck assembly comprises the truck beam 30, the wheels W, the tires, the brakes, the brake rods 38,42 and the truck positioner cylinder 50. The shock strut 16 comprises the inner cylinder 24, the outer cylinder 22, and the torque linkage 27,28. The retraction mechanism comprises the trunnion hanger 14, the walking beam 58, the retraction cylinder 64, and the idler link 62. the down-lock strut comprises the front link 108, the rear link 110, and the down-lock cylinder 144. The drag brace comprises the upper link 112, the lower link 114, and the stabilizer link 136.

All of the above-named parts are arranged and joined together as shown in FIG. 1 of the drawing. All of the joints shown are pivot joints, allowing rotation of the adjoining parts to the extend required for proper functioning of the gear assembly and its components. The manner of folding of the foldable links in the gear assembly is clearly shown in FIGS. 2 and 6 of the drawing.

The gear assembly is attached to the airplane at three points. Specifically, it is attached at the lower joint of the idler link, at the upper joint of the trunnion hanger, and at the upper conjunction of the down-lock strut and drag brace.

The trunnion hanger has two horns (or lugs) at its lower end which serve as attachments for the locking beam and the retraction cylinder respectively. These horns are an integral part of the trunnion hanger and therefore there is no relative motion between them and the hanger.

Similar horns or lugs are an integral part of the outer cylinder and serve as attachments for the trunnion hanger, the down-lock strut, the drag brace, and the upper end of the torque linkage. Likewise, similar horns or lugs are an integral part of the inner cylinder and serve as attachments for the lower ends of the torque linkage, the truck beam, the truck positioner and the brake rods.

The truck beam has a horn as an attachment part of itself for mounting the truck positioner.

With the exception of the variable length drag brace, the gear assembly works in the same manner as similar gear assemblies found on prior aircraft. The main landing gears of the Fokker F-27, the Convair B-58, and the Handley Page Victor are all equipped with trunnion hangers. However, their drag braces are all one-piece components. The F-27 has no truck. It is equipped with dual wheels instead. The combination of a walking beam, a retraction cylinder and an idler link can be found on airplanes such as the Boeing 707, 727, and 747. However, these Boeing airplanes do not have main landing gears equiped with trunnion hangers.

In the case of the F-27, the B-58, and Victor, the inclusion of a trunnion hanger and the gear assembly was sufficient to solve the problem of lack of storage space. However, in the installation at hand, space constraints were more critical, making it necessary to do something that was different from what has been done in the past.

FIG. 6 includes lines showing the paths of four points in the geometry of the gear assembly, illustrating the motions of these points during gear assembly retraction. In FIG. 1 of the drawing, the trunnion hanger is shown to be nearly vertical. In FIG. 6 it is shown to have been rotated counter-clockwise to roughly a horizontal position, thus effecting a space saving of almost its own length. Also in FIG. 1 the lower link of the drag brace is aligned with the upper link and is held in a straight line position by the stabilizer link. This is necessary during ground running, during takeoff and during landing. This arrangement prevents buckling of the drag brace and consequent collapse of the gear assembly. In accordance with an aspect of the invention, it is done without any secondary locking devices. In FIG. 6, the lower link of the drag brace is shown to have been rotated with repect to the upper link so as to lie in a roughly horizontal position, thus effecting an additional space saving of almost twice the length of the lower link. It should be readily apparent that any significant space saving depends heavily on the designers skill and ingenuity in providing as much length as possible in the hanger and the lower link.

During gear assembly cycling, the combined motions of the trunnion hanger and the drive brace result in a nearly vertical path for the wheels as they enter or leave the stowage compartment, making an ideal drop path during normal and emergency deployment of the gear.

The operation of the gear assembly and its principal components, using the terminology of The Boeing Company, is as follows:

During ground running pressurized air volumes in the tires and in the shock strut act as springs to cushion loads generated by rough or uneven pavement. When the brakes are applied, small hydraulic pistons in the brake housings are activated to cause a clamping of the brake rotor disks against brake stater disks. The brake rotor disks are keyed to the wheels and the brake stater disks are keyed to the brake housings. The resulting friction converts the kinetic energy of the airplane's forward motion to heat energy which quickly dissapates to the ambient temperature. Meanwhile, the forces generated by the brakes are reacted through the brake rods and into the inner cylinder. One end of each brake rod is attached to each brake by means of a lug which is an integral part of the brake housing.

Upon takeoff, the airplane lifts off of the ground, allowing pressurized air in the telescopic shock strut to extend the strut to its stowing length. Throughout all gear operations, whether it be ground running, retraction or deployment, the telescopic elements of the shock strut (the inner and outer cylinders) must be kept locked against torsional motion with respect to each other. This is achieved by use of the foldable torque linkage. Further, upon takeoff, the hydraulic downlock cylinder is activated to cause the downlock strut to break over center out of its straight line position. This allows it to move freely and begin folding. Then, the hydraulic reaction cylinder is activated. It functions to swing the trunnion hanger to its stowed position, dragging and lifting the foldable components and the rest of the gear assembly with it. The hydraulic truck positioner is also activated after lift-off rotating the truck beam to its inverted position for stowing.

When the upper cylinder of the shock strut rise within a couple of inches of its stowed position, an uplock roller 25 mounted near its lower front end is engaged and captured by an uplock hook mechanism 27 mounted above it in the stowage compartment. This completes the retraction cycle.

During the deployment cycle prior to landing, all of the operations described above for retracting the gear assembly are reversed. A hydraulic uplock cylinder unlocks the uplock hook 27, allowing the gear assembly to free-fall (by the action of gravity and aerodynamic forces) and lock into its landing position. In an emergency operation, the gravity and aerodynamic forces are relied upon to deploy the gear. In an emergency operation, when hydraulic pressure is absent to activate the uplock cylinder, a back-up system disengages the uplock hook from the uplock roller to allow the gear to free fall.

In normal operation, the gravity and aerodynamic forces may be augmented by the normal functioning of the hydraulic system and its components. In either circumstances, the gear is lowered to its landing position with both the downlock strut and the drag strut secured in their respective straight-line orientations. Otherwise, they would buckle under the landing loads and the gear assembly would collapse.

Also, during gear deployment, the truck beam is re-inverted to position the tires for landing. Should the truck positioner fail, drag forces generated by contact between the rear tires and the ground would be relied upon to crank the truck beam into the landing position.

During the short time interval between initial touchdown and firm contact on all tires with the pavement, the telescopic stroking of the shock strut forces oil in the strut through an orifice. The resulting friction converts the kinetic energy of the descending airplane to heat energy which is quickly dissapated to the ambient atmosphere, thus damping out the shock of landing. This completes the gear deployment cycle and normal ground running (taxiing) is commenced.

The above described illustrated embodiment is presented as an example and not for purposes of limitation. The invention is only to be limited by the following claims and the rules of claim interpretation, including the doctrine of equivalents.

What is claimed is:

1. In an aircraft:
   frame means defining a landing gear stowage compartment, a first mounting station in an upper central portion of the stowage compartment, and a second mounting station in said stowage compartment which is spaced both horizontally and vertically downwardly from the first mounting station; and
   a landing gear that is retractable into and extendable out from said stowage compartment, comprising:
   a folding wheel strut comprising an upper portion having upper and lower ends and a lower portion having upper and lower ends;
   wheel means at the lower end of the lower portion of the wheel strut;
   means mounting the upper end of the upper portion of the wheel strut to said frame means at the first mounting station, for pivotal movement about a fixed first horizontal axis;
   means connecting the lower end of the upper portion of the wheel strut to the upper end of the lower portion of the wheel strut, for pivotal movement about a second horizontal axis that is parallel to said first horizontal axis;
   an extend/retract actuator means connected between the upper portion of the wheel strut and a third mounting station on said frame means spaced from the first mounting station in a direction horizontally opposite the second mounting station, for pivoting the upper portion of the wheel strut in position about said first axis, between an in use position in which the upper portion of the wheel strut extends substantially vertically downwardly from the first mounting station and a retracted position in which the upper portion of the wheel strut is within the stowage compartment; and
   a folding drag brace truss means interconnected between the lower portion of the wheel strut and the second mounting station, said folding drag brace truss means being movable in response to pivotal movement of the upper portion of the wheel strut, between an in use position in which said folding truss means extends in a bracing position between the second mounting station and the wheel strut, to brace and fully stabilize the landing gear, and a folded position in which the folding truss means is located within the stowage compartment, generally between the first and second mounting stations, said folding truss means functioning in response to pivotal movement of the upper portion of the wheel strut to move the lower portion of the wheel strut between an in use position in which it is substantially vertically aligned with the upper portion of the wheel strut, and both of said wheel strut portions extend substantially vertically downwardly from the first mounting station, and a retracted position within the stowage compartment in which the upper portion of the wheel strut extends from the first mounting station generally towards the second mounting station and the lower portion of the wheel strut is folded generally up against the upper portion of the wheel strut.

2. The combination of claim 1, wherein said folding truss means comprises a four-bar linkage which during retraction of the landing gear automatically folds itself to vary its own effective length such that the landing gear is constrained and is raised in a fully controlled and safe manner into its stowed position.

3. The combination of claim 1, in which the folding truss means includes an upper two part strut which is interconnected between the second mounting station and the upper end of the lower portion of the folding wheel strut, said parts having inner ends which are pivotally connected together and having outer ends, with the outer end of one of said parts being pivotally connected to the upper end of the lower portion of the folding wheel strut and with the outer end of the second upper strut part being pivotally connected to the frame means at the second mounting station, and said folding truss means further including a second two part strut interconnected between the second mounting station of the frame means and a lower end part of the lower portion of the folding wheel strut, said parts of said second brace strut having inner ends which are pivotally connected together and having outer ends, with the outer end of one of said struts being pivotally connected to the lower portion of the folding wheel strut and the outer end of the other part being pivotally connected to the frame means at the second mounting station.

4. The combination of claim 3, further comprising a brace link having two ends, and means pivotally connecting one of the ends of a lower portion of the folding wheel strut, at a location spaced vertically between the pivotal connection of the upper and lower brace struts to said lower portion of the folding wheel strut, and an opposite end which is pivotally connected to the part of the second brace strut which is connected to the frame means at the second mounting station, at a location between the two ends of said part.

5. In an aircraft:
frame means defining a landing gear stowage compartment, a first mounting station in an upper central portion of the stowage compartment, and a second mounting station in said stowage compartment which is spaced both horizontally and vertically downwardly from the first mounting station; and a landing gear that is retractable into and extendable out from said stowage compartment, comprising:
a folding wheel strut comprising an upper portion having upper and lower ends and a lower portion having upper and lower ends;
wheel means at the lower end of the lower portion of the wheel strut;
means mounting the upper end of the upper portion of the wheel strut to said frame means at the first mounting station, for pivotal movement about a fixed first horizontal axis;
means connecting the lower end of the upper portion of the wheel strut to the upper end of the lower portion of the wheel strut, for pivotal movement about a second horizontal axis that is parallel to said first horizontal axis;
an extend/retract actuator means connected between the frame means and the upper portion of the wheel strut, for pivoting the upper portion of the wheel strut in position about said first axis, between an in use position in which the upper portion of the wheel strut extends substantially vertically downwardly from the first mounting station and a retracted position in which the upper portion of the wheel strut is within the stowage compartment; and
a folding drag brace truss means interconnected between the lower portion of the wheel strut and the second mounting station, said truss means being movable in response to pivotal movement of the upper portion of the wheel strut, between an in use position in which said folding truss means extends in a bracing position between the second mounting station and the wheel strut, to brace and fully stabilize the landing gear, and a folded position in which the folding truss means is located within the stowage compartment, generally between the first and second mounting stations, said folding truss means functioning in response to pivotal movement of the upper portion of the wheel strut to move the lower portion of the wheel strut between an in use position in which it is substantially vertically aligned with the upper portion of the wheel strut, and both of said wheel strut portions extend substantially vertically downwardly from the first mounting station, and a retracted position within the stowage compartment in which the upper portion of the wheel strut extends from the first mounting station generally towards the second mounting station and the lower portion of the wheel strut is folded generally up against the upper portion of the wheel strut;

said truss means including an upper two part strut which is interconnected between the second mounting station and the upper end of the lower portion of the folding wheel strut, said parts having inner ends which are pivotally connected together and having outer ends, with the outer end of one of said parts being pivotally connected to the upper end of the lower portion of the folding wheel strut and with the outer end of the second upper strut part being pivotally connected to the frame means at the second mounting station, and said folding truss means further including a second two part strut interconnected between the second mounting station of the frame means and a lower end part of the lower portion of the folding wheel strut, said parts of said second brace strut having inner ends which are pivotally connected together and having outer ends, with the outer end of one of said struts being pivotally connected to the lower portion of the folding wheel strut and the outer end of the other part being pivotally connected to the frame means at the second mounting station, a brace link having two ends, and means pivotally connecting one of the ends to a lower portion of the folding wheel strut, at a location spaced vertically between the pivotal connection of the upper and lower brace struts to said lower portion of the folding wheel strut, and an opposite end which is pivotally connected to the part of the second brace strut which is connected to the frame means at the second mounting station, at a location between the two ends of said part.

6. The combination of claim 5, further including a control arm at the upper end of the lower portion of the folding wheel strut, extending in a fixed position out from said lower portion of the folding wheel strut, and with said first brace strut being pivotally connected to said control arm, at a location spaced outwardly from the second horizontal axis.

7. The combination of claim 6, further including a lock actuator interconnected between a fixed portion of the frame means at the second mounting station and the part of the first brace strut which is pivotally connected to the frame means at the second mounting station, said actuator being connected to the frame means at a location which is offset from the pivotal axis of connection of said first brace strut part to the frame means at the second mounting station, so that when the length of said actuator is fixed, the actuator will lock the strut part in position.

8. In an aircraft:
frame means defining a landing gear stowage compartment;

a landing gear that is retractable into and extendable out from said stowage compartment, comprising:

a folding wheel strut comprising an upper portion having upper and lower ends and a lower portion having upper and lower ends;

wheel means at the lower end of the lower portion of the wheel strut;

means mounting the upper end of the upper portion of the wheel strut to said frame means at an upper central portion of the stowage compartment, for pivotal movement about a fixed first horizontal axis;

means connecting the lower end of the upper portion of the wheel strut to the upper end of the lower portion of the wheel strut, for pivotal movement about a second horizontal axis that is parallel to said first horizontal axis;

a folding drag brace truss means comprising a biforcated upper brace arm having a forward end and a rearward end, and a biforcated lower brace arm having a forward end and a rearward end, means connecting the rearward ends of said upper and lower brace arms to the frame means for rotation about a third horizontal axis, that is parallel to the first and second axes, at a location within the stowage compartment spaced both horizontally rearwardly and vertically downwardly from the first axis, means pivotally connecting the forward end of the biforcated upper brace arm to an upper part of the lower portion of the folding wheel strut, means pivotally connecting the forward end of the biforcated lower brace strut to a lower part of the lower portion of the folding wheel strut, a cross brace strut having forward and after ends, means pivotally connecting the forward end of said cross brace strut to an intermediate part of the lower portion of the folding wheel strut, and means pivotally connecting the after end of said cross brace strut to an intermediate part of the second brace strut; and an extend/retract actuator means having forward and after ends, means connecting the forward end of the actuator means to said frame means at a location within said stowage compartment spaced forwardly of the first horizontal axis, wherein said upper and lower portions of the folding wheel strut are substantially vertical, and said drag brace truss means is unfolded and performing a bracing function when the extend/retract actuator means is retracted, wherein extension of the extend/retract actuator means will swing the upper portion of the folding wheel strut in position about the first horizontal axis, both rearwardly and upwardly into the stowage compartment, and wherein the upper and lower brace arms of the folding drag brace truss will in response to such swinging movement of the upper portion of the folding wheel strut cause the lower portion of the folding wheel strut to fold upwardly into the stowage compartment, adjacent and below the upper portion of the folding wheel strut, the upper biforcated brace strut will fold upwardly into a position within the stowage compartment rearwardly of the folded wheel strut, and the lower brace strut will fold upwardly into a position within the stowage compartment adjacent and below the folded wheel strut.

9. The combination of claim 8, wherein the upper portion of the folding wheel strut includes a crank arm which projects from the first pivot axis generally opposite the direction of extent of the upper portion of the folding wheel strut, and said combination further includes a first reaction link having an after end that is pivotally connected to an outer end of said crank arm, and a forward end which is pivotally connected to both the forward end of the extend/retract actuator means and an upper end of a second reaction link, and wherein the second reaction link includes a lower end, and means pivotally connecting said lower end to said frame means.

10. The combination of claim 8, wherein the biforcated upper brace arm comprises first and second arm parts which are pivotally connected together where they meet, and each said arm part includes a lock shoulder which makes abutting contact with the lock shoulder of the other when the two arm parts are unfolded, said engagement of the lock shoulders preventing folding movement of the two arm parts downwardly beyond a substantially axially aligned position, and lock actuator means interconnected between said frame means and one of said arm parts, for urging said arm parts into a substantially axially aligned position, with the two lock shoulders in abutting contact.

11. The combination of claim 8, further including linkage means and a position actuator means for positioning the wheel means relative to the lower portion of the folding wheel strut during extension and retraction of the folding wheel strut.

* * * * *

UNITED STATES PATENT AND TRADEMARK OFFICE
CERTIFICATE OF CORRECTION

PATENT NO. : 4,720,063

DATED : January 19, 1988

INVENTOR(S) : Milton E. James and John A. Stepien

It is certified that error appears in the above-identified patent and that said Letters Patent are hereby corrected as shown below:

Page 1 of 2

Column 1, line 24, "No. 2,432,4008" should be -- No. 2,432,408 --.

Column 1, lines 46 and 47, "GermanAuslegeschrift" should be -- German Auslegeschrift --.

Column 3, line 43, "ear 58" should be -- ear 68 --.

Column 4, line 19, "uppe" should be -- upper --.

Column 4, line 45, "by" should be -- be --.

Column 6, line 10, after "secured", insert -- to brace arm part 110. Lock actuator 144 is operated --.

Column 6, line 29, "Thus" should be -- This --.

Column 7, line 33, "link 62. the" should be -- link 62. The --.

Column 7, line 41, "extend" should be -- extent --.

Column 9, line 14, "rise" should be -- rises --.

Column 9, lines 34 and 35, "circumstances" should be -- circumstance --.

Claim 4, column 11, line 16, "ends of a" should be -- ends to a --.

UNITED STATES PATENT AND TRADEMARK OFFICE
CERTIFICATE OF CORRECTION

PATENT NO. : 4,720,063
DATED : January 19, 1988
INVENTOR(S) : Milton E. James and John A. Stepien It is certified that error appears in the above-identified patent and that said Letters Patent are hereby corrected as shown below:

Page 2 of 2

Claim 8, column 13, line 42, after "connecting the", insert
-- after end to an intermediate part of the upper portion of the folding wheel strut, and means connecting the --.

Signed and Sealed this

Fifth Day of July, 1988

Attest:

DONALD J. QUIGG

Attesting Officer

Commissioner of Patents and Trademarks